United States Patent [19]

Linnenbank

[11] Patent Number: 5,643,074
[45] Date of Patent: Jul. 1, 1997

[54] METHOD AND APPARATUS FOR FILLETING THE BREAST PIECE OF SLAUGHTERED POULTRY

[75] Inventor: Leonardus Mattheus Petrus Linnenbank, Oostzaan, Netherlands

[73] Assignee: Machinefabriek Meyn B.V., Oostzaan, Netherlands

[21] Appl. No.: 547,883

[22] Filed: Oct. 25, 1995

[30] Foreign Application Priority Data

Oct. 26, 1994 [NL] Netherlands ............. 9401773

[51] Int. Cl.$^6$ .................................. A22C 21/00
[52] U.S. Cl. .................. 452/165; 452/136; 452/135; 452/170
[58] Field of Search ................. 452/165, 170, 452/149, 127, 136, 135

[56] References Cited

U.S. PATENT DOCUMENTS

| | | |
|---|---|---|
| 3,570,050 | 3/1971 | Draper et al. . |
| 4,688,297 | 8/1987 | Bartels . |
| 4,951,354 | 8/1990 | Callsen et al. . |
| 5,045,024 | 9/1991 | Diesing ............. 452/165 |
| 5,069,652 | 12/1991 | Hazenbroek . |
| 5,372,539 | 12/1994 | Kunig et al. . |
| 5,545,083 | 8/1996 | Bargecé et al. ............. 452/165 |

FOREIGN PATENT DOCUMENTS

| | | |
|---|---|---|
| 0168865 | 1/1986 | European Pat. Off. . |
| 0183986 | 6/1986 | European Pat. Off. . |
| 0336162 | 10/1989 | European Pat. Off. . |
| 0591741A1 | 4/1994 | European Pat. Off. . |
| 4105564A1 | 8/1992 | Germany . |

*Primary Examiner*—Willis Little
*Attorney, Agent, or Firm*—Dority & Manning

[57] ABSTRACT

The invention relates to a method for filleting the breast piece of slaughtered poultry including at least the sternum and the wishbone defined by both clavicles, wherein the breast piece is supported and the breast flesh is cut loose from the sternum and the wishbone by means of cutting means. Prior to cutting loose the breast flesh, the wishbone is pressed inwardly as seen relative to the breast piece. Further, the invention relates to an apparatus for carrying out the method having a pressure means movable to and fro which in an operative position can engage the wishbone in order to press it inwardly relative to the breast piece.

8 Claims, 2 Drawing Sheets

5,643,074

METHOD AND APPARATUS FOR FILLETING THE BREAST PIECE OF SLAUGHTERED POULTRY

BACKGROUND OF THE INVENTION

The present invention relates to a method for filleting the breast piece of slaughtered poultry comprising at least the sternum and the wishbone that is defined by both clavicles, wherein the breast piece is supported and the breast flesh is cut loose from the sternum and the wishbone by a cutting means.

When, according to the known method, the breast flesh is cut loose from the breast piece and from the wishbone, it often appears that bone remainders are present in the breast flesh cut loose. There are many reasons for the presence of such bone remainders.

It is to be noted that the bone remainders mainly originate from the wishbone. The poultry from which the breast piece originates principally are young chickens which are not yet fully grown. As a result, bone fractures may occur during several stages from little chicken until finished end product. Already during capturing chickens fractures may occur in the not yet fully grown wishbone because the chickens wildly flap their wings. Also during stunning, previous to slaughtering, jerky muscle tensions sometimes result in undesired bone fractures. The successive plucking of slaughtered chickens with mechanical plucking fingers is another source of bone fractures. Finally, bone fractures may result from the automatic ready-to-cook machines with which the slaughtered chicken is made ready to cook. Eviscerators also belong to this category of machines.

As a result, isolated fragments of the wishbone may remain in the breast flesh, which, of course, is undesired. According to the state of the art, this leads to the need of a manual handling of the breast flesh and a manual removal of possible bone fragments. If one wants to rule out that such bone fragments are present, a wide cut around the wishbone has to be made. It is a disadvantage of this solution that a relatively large part of the breast flesh is lost.

OBJECTS AND SUMMARY OF THE INVENTION

The present invention aims at providing a method of the type referred to above wherein the mentioned disadvantages can be prevented in a simple, but nevertheless effective way. Additional objects and advantages of the invention will be set forth in part in the following description, or may be obvious from the description, or may be learned through practice of the invention.

Thus, according to the invention, the method is characterized in that prior to cutting loose the breast flesh, the wishbone is pressed inwardly as seen relatively to the breast piece.

By pressing the wishbone inwardly, as seen relatively to the breast piece, it is put out of reach of the cutting means, such that the breast flesh cut loose can no longer contain bone fragments. Moreover, as a result thereof, the cutting means can cut loose a larger part of the breast flesh such that for each bird the yield of flesh is increased.

Further, the invention relates to an apparatus for carrying out the method according to the invention, with means for supporting the breast piece and cutting means for cutting loose the breast flesh from the sternum and the wishbone.

In accordance with the invention, the apparatus is characterized by a pressure means movable to and fro relative to the supporting means, wherein in an operative position the supporting means can engage the wishbone in order to press it inwardly relative to the breast piece.

According to a preferred embodiment of the apparatus according to the invention, the pressure means is provided with a cutting edge at its side meant for engaging the wishbone. The advantage of such a cutting edge is that the pressure means can directly engage the wishbone without any breast flesh being present therebetween. For, the cutting edge enables the pressure means to cut with its respective side through the breast flesh until engaging the wishbone and pressing it away.

Further, it is preferred that the pressure means is shaped as a loop-like brace attached to the end of an operating rod movable to and fro.

The shape of the loop-like brace may be such that the tip of the wishbone, where the two clavicles meet each other, is engaged. In practice it appears that often this part of the wishbone remains as a bone fragment in the breast flesh. Due to the special shape of the loop-like brace, it is guaranteed now that this section of the wishbone is pressed inwardly also and will not be present in the breast flesh cut loose.

However, it is possible too that the loop-like brace has such dimensions that it can pass around the wishbone and at its side facing away from the cutting edge comprises a plate section meant for engaging the wishbone, whereas the cutting edge is interrupted at that part of the loop-like brace which crosses the wishbone. Together with the plate section, the loop-like brace in a way defines a reversed cup receiving the wishbone and the flesh in the immediate vicinity thereof. Due to the interruption in the cutting edge at that part of the loop-like brace which crosses the wishbone, the wishbone remains connected with the carcass and is only pushed out of reach of the filleting means when the brace is engaged. With this embodiment, it is prevented in an optimized way that bone remainders are present in the breast flesh cut loose. However, with this embodiment the yield of flesh is smaller.

An additional advantage of this embodiment is that by means of the tip of the loop-like brace a tendon extending between the tip of the wishbone and the sternum can be cut through.

The operating rod may be movable to and fro in several ways, for example by means of a follower roll attached thereto which co-operates with a curved track. However, other driving mechanisms are conceivable to.

In accordance with a different embodiment, the apparatus according to the invention is characterized by securing means which are movable between a first position in which they can engage the wing joints, and a second position in which they disengage the wing joints. These securing means take care of a well defined positioning of the wing joints such as to further improve the operation of the apparatus.

Finally, a special embodiment of the apparatus according to the invention is mentioned wherein the pressure means is carried by the supporting means. In such an embodiment the pressure means basically moves synchronously with the supporting means which in turn, in a way known per se, may be part of an endless circular conveyor device.

Hereinafter the invention will be elucidated referring to the drawing, in which an embodiment of the apparatus according to the invention is illustrated.

DETAILED DESCRIPTION OF THE PREFERRED EMBODIMENTS

Figure 1:
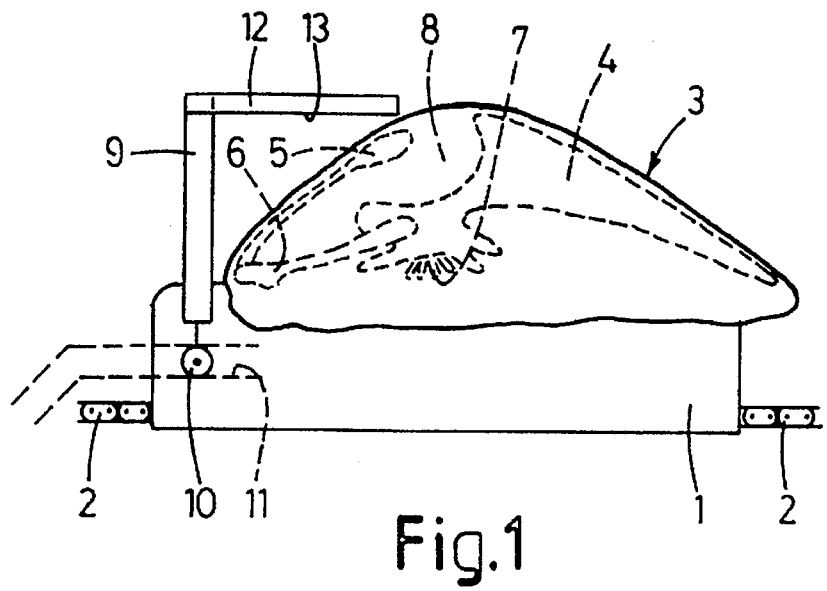
FIG. 1 shows schematically a side elevational view of a part of an embodiment of the apparatus according to the invention, with breast piece attached thereto, in a first position.

Reference will now be made in detail to the presently preferred embodiment of the invention, one or more examples of which are illustrated in the drawings. Each example is provided by way of explanation of the invention, and not as a limitation of the invention. For example, features illustrated or described as part of one embodiment may be used on another embodiment to yield still a further embodiment. Additionally, the numbering of components is consistent throughout the application, with the same component having the same number in the description and the drawings.

FIG. 1 shows in a side elevational view a section of an apparatus for carrying out the method according to the invention with a supporting means for a breast piece of slaughtered poultry shaped as a carriage 1. This carriage 1 can be part of an endless conveyor, which in the present case has been indicated schematically by chains 2, wherein a large amount of carriages 1 follow an endless conveying track.

A breast piece 3, schematically indicated in the figures, supported onto the carriage 1 comprises at least the sternum 4 and the wishbone 5 formed by both clavicles. In the situation shown, also the coracoids 6 and part of the ribs 7 are shown. The respective breast piece is completed by the breast flesh 8.

The shape of the carriage 1 is adapted to the expected shape and dimensions of the breast piece. Depending upon the destination of the breast piece and the products obtained therefrom, the breast piece can be larger or smaller than represented.

In the carriage, an operating rod 9 is provided which is movable to and fro relative to the carriage 1. Although this movement to and fro of the operating rod 9 may be realized in many conventional ways, in FIG. 1 and FIG. 2 a constructive embodiment is represented according to which a follower roll 10 is attached to the lower most end of the operating rod 9, the roll 10 being adapted to co-operate with a stationary curved track 11 indicated in dotted lines.

In the non-operative position of the operating rod illustrated in FIG. 1, a pressure means 12 attached to the upper end thereof is positioned just above the breast piece. In this position, a breast piece 3 can be positioned onto the carriage 1 easily. When the conveyor, represented by chain 2, moves on the carriage 1 the operating rod 9 will be moved downwardly to an operative position due to a cooperation between the follower roll 10 and the curved track 11, such that the pressure means 12 will engage the breast piece. As a result the breast piece 3 will firstly be clamped onto the carriage 1.

A continued downward movement of the operating rod 9 relative to the carriage 1 will result in pressing the wishbone 5 downwardly relative to the breast piece 3. In this manner, the situation is obtained as indicated schematically in FIG. 2. One can see that the follower roll 10 is at a section of the curved track 11 positioned at a lower level than the section of the curved track 11 at which the follower roll 10 is according to FIG. 1.

Figure 2:
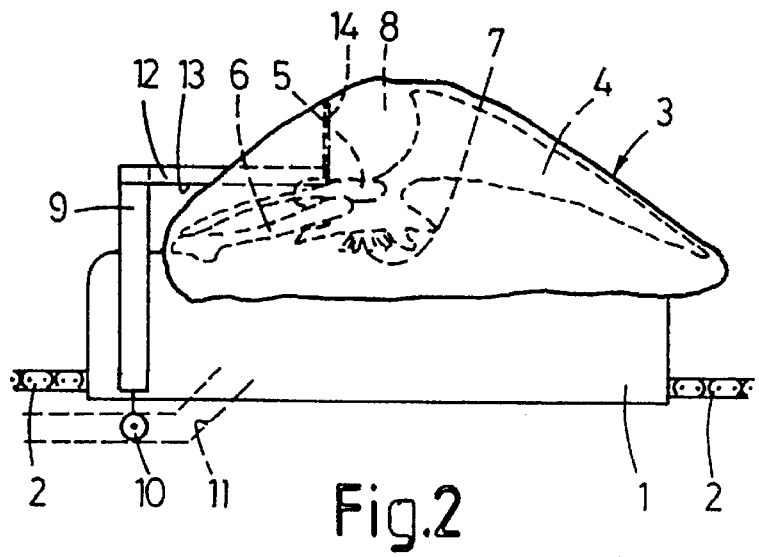
FIG. 2 shows the apparatus of FIG. 1 in a second position.

In the position shown in FIG. 2, the breast flesh of the breast piece 3 can be cut loose by appropriate cutting means without the risk that the breast flesh cut loose comprises bone fragments which originate from the wishbone.

Figure 3:
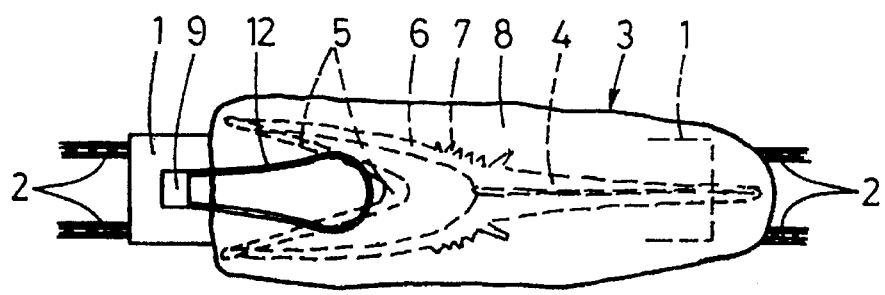
FIG. 3 shows the apparatus of FIG. 1 in a top plan view.

As appears clearly from FIG. 3, the pressure means 12 is shaped as a loop-like brace not only engaging the clavicles defining the wishbone 5, but also the connecting piece between both clavicles (i.e. the tip of the wishbone). As a result, also this tip of the wishbone which is often present in the breast piece as an isolated bone fragment, will be pushed out of reach of the cutting means effectively.

Preferably the pressure means 12 comprises a cutting edge 13 at its side meant for engagement with the wishbone 5. Like this, the wishbone 5 can be pressed downwardly without simultaneously pressing downward part of the breast flesh. Thus, the yield during cutting loose the breast flesh is increased.

The cutting means applied for cutting loose the breast flesh 8 from the breast piece 3 are not illustrated in the drawing because these are of a type known per se. However, now the shape of the cutting means may be chosen in such a way that a larger part of the breast flesh is cut loose from the breast piece because there is no risk anymore of bone fragments being present in the breast flesh cut loose.

Figure 4:
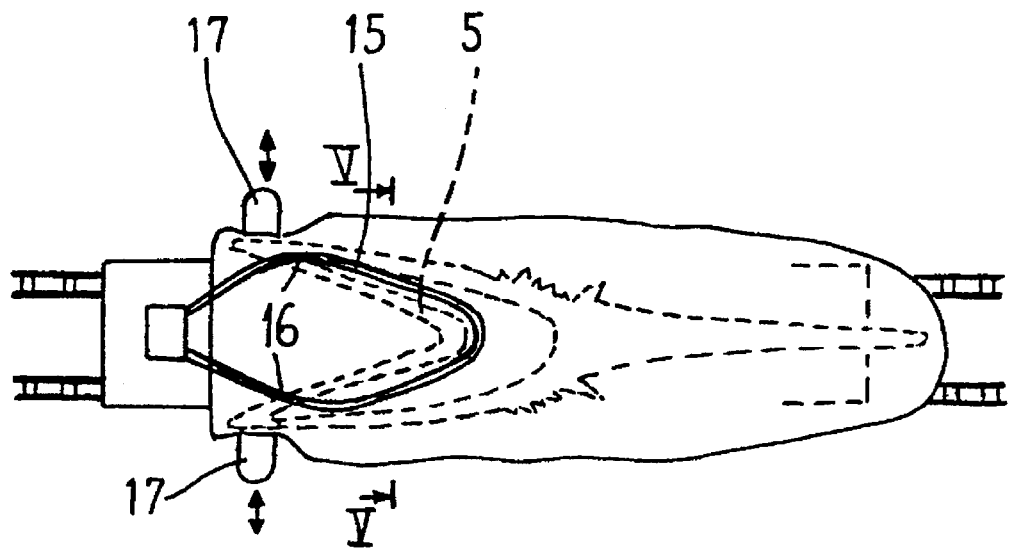
FIG. 4 shows in a top plan view according to FIG. 3 an amended embodiment of the apparatus.

In the embodiment according to FIG. 4, the pressure means is shaped as a loop-like brace 15, however it is bigger than the loop-like brace 12 according to FIG. 3. The loop-like brace 15 has such dimensions that it can pass around the wishbone 5. At that part 16 where the brace crosses the wishbone 5 the cutting edge 19 (see FIG. 5) of the brace 15 is interrupted (not shown) such that the wishbone is not cut loose from the remainder of the carcass.

Figure 5:
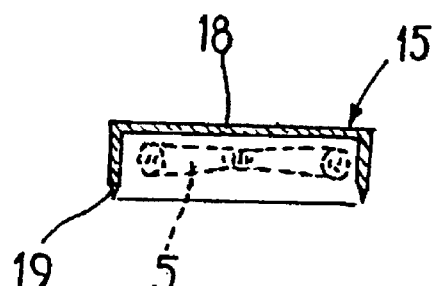
FIG. 5 shows on an enlarged scale according to V—V in FIG. 4 a cross-section of the loop-like brace.

As appears clearly from FIG. 5, the brace 15 comprises a plate section 18 at its side facing away from the cutting edge 19, such that in a way a reversed closed cup is defined into which the wishbone 5 is largely housed. Simultaneously with moving the wishbone 5 downward using the brace 15, also a part of the breast flesh is moved out of reach of the filleting means to be applied later. Further the tip of the brace 15 cuts through a tendon extending between the tip of the wishbone 5 and the sternum. Due to the mentioned interruptions in the cutting edge 19 the wishbone 5 remains attached to the carcass.

Further in FIG. 4, securing means 17 are indicated schematically which in correspondence with the double arrows are movable to and fro between a first position (indicated in FIG. 4) in which they engage the wing joints of the breast piece and a second position in which they disengage the wing joints. These securing means 17 in the first position secure the position of the breast piece in a defined way such that the operations to be carried out are reproducible.

The invention is not limited to the embodiments described above, which can be varied widely within the scope of the claims. As mentioned before, a solution in respect of the to and fro movement of the pressure means 12 and operating rod 9, respectively, other than the application of an assembly comprising follower roll and curved track may be provided. Driving means housed in the carriage 1, such as a cylinder-piston assembly or alike, are possible too. Further, it is not absolutely necessary that the pressure means is attached to the carriage 1. It is also possible that the pressure means belongs to an external driving mechanism by means of which the pressure means moves synchronously with the carriage 1 and the breast piece provided thereon for a limited time while carrying out its operation.

Further, it is noted that basically it is conceivable to provide a stationary supporting means for the breast piece instead of carriage moved on by the conveyor, in which case the cutting means move along the stationary supporting means which have breast pieces provided thereon.

Finally the shape of the pressure means may differ from the loop-like brace described before.

It is intended that the present invention cover the variations and modifications coming within the slope of the appended claims and their equivalents.

I claim:

1. An apparatus for filleting the breast piece of slaughtered poultry wherein the breast piece included the sternum and the wishbone defined by both clavicles, comprising:

a conveying apparatus defining conveying path for the slaughtered poultry;

at least one carriage member configured with said conveying apparatus, said carriage member having a shape for supporting the breast piece as it conveyed along said conveying path;

a cutting device operably disposed along said conveying path for cutting loose the breast flesh from the breast piece;

a automatically actuated pressure device configured with said carriage member and movable relative thereto, said pressure device automatically movable to an operative position and having a shape so that in said operative position said pressure device engages the wishbone of the breast piece pressing the wishbone inwardly relative to the breast piece prior to the breast flesh being cut loose by said cutting device.

2. The apparatus as in claim 1, further comprising a plurality of said carriage members configured on an endless conveyor system.

3. The apparatus as in claim 1, wherein said pressure device further comprises a cutting edge defined on a side thereof engaging the wishbone.

4. The apparatus as in claim 1, wherein said pressure device comprises a generally loop-shaped member operably configured at and end of a automatically movable operating rod.

5. The apparatus as in claim 4, wherein said operating rod is moved by an engaging member defined along said conveying path prior to said cutting device.

6. The apparatus as in claim 5, wherein said engaging member comprises a track and follower device.

7. The apparatus as in claim 1, wherein said pressure device comprises a generally loop-shaped member having dimensions so as to generally encompass the wishbone, said loop-shaped member having a cutting edge on a side thereof towards the breast piece and a plate member on an opposite side, said plate member engaging the wishbone as said cutting edge cuts into the breast flesh along the wishbone, said cutting edge interrupted at locations where said loop-shaped member crosses the wishbone.

8. The apparatus as in claim 1, wherein said pressure device comprises a generally vertically extending member movable upwards and downwards relative to said carriage member, and a generally horizontally extending member attached to said vertically extending member which engages the wishbone as said vertically extending member is automatically moved downwards.

* * * * *